(12) United States Patent
Riedel et al.

(10) Patent No.: US 12,304,064 B2
(45) Date of Patent: May 20, 2025

(54) ROBOT

(71) Applicant: KUKA Deutschland GmbH, Augsburg (DE)

(72) Inventors: Martin Riedel, Augsburg (DE); Dieter Schaab, Augsburg (DE)

(73) Assignee: KUKA DEUTSCHLAND GMBH (DE)

( * ) Notice: Subject to any disclaimer, the term of this patent is extended or adjusted under 35 U.S.C. 154(b) by 133 days.

(21) Appl. No.: 18/245,212

(22) PCT Filed: Sep. 13, 2021

(86) PCT No.: PCT/EP2021/075055
§ 371 (c)(1),
(2) Date: Mar. 14, 2023

(87) PCT Pub. No.: WO2022/053664
PCT Pub. Date: Mar. 17, 2022

(65) Prior Publication Data
US 2023/0364810 A1 Nov. 16, 2023

(30) Foreign Application Priority Data
Sep. 14, 2020 (DE) .................. 10 2020 211 480.3

(51) Int. Cl.
*B25J 17/00* (2006.01)
*B25J 9/16* (2006.01)
(Continued)

(52) U.S. Cl.
CPC ............... *B25J 17/00* (2013.01); *B25J 9/163* (2013.01); *B25J 9/1674* (2013.01); *B25J 19/0004* (2013.01); *B25J 19/02* (2013.01)

(58) Field of Classification Search
CPC .................. B25J 9/06; B25J 9/0009
See application file for complete search history.

(56) References Cited

U.S. PATENT DOCUMENTS 4,547,119 A * 10/1985 Chance .................... B25J 9/045
    414/718
5,155,423 A * 10/1992 Karlen ..................... B25J 9/046
    318/568.1

(Continued)

FOREIGN PATENT DOCUMENTS

| DE | 3918587 A1 | 12/1989 |
| EP | 2792456 A2 | 10/2014 |
| JP | 2010221355 A | 10/2010 |

OTHER PUBLICATIONS

European Patent Office; Search Report in related International Patent Application No. PCT/EP2021/075055 dated Jan. 10, 2022; 3 pages.

*Primary Examiner* — Jake Cook
(74) *Attorney, Agent, or Firm* — Dorton & Willis, LLP

(57) ABSTRACT

A robot has a robotic arm, including a base with a base contact surface and an end-effector that is connected to the base by joints which can be adjusted by robotic arm joint drives such that the end-effector has at least five, and in particular at least six, actuated degrees of freedom with respect to the base. The robot further includes a robot joint module with a first contact surface that can be fastened—in particular, releasably—to the base contact surface, a second contact surface for fastening the robot to a stationary environment or mobile platform, and at least one robot joint module drive for pivoting the first contact surface relative to the second contact surface about a pivot axis, so that the end-effector has at least six, and in particular at least seven, actuated degrees of freedom with respect to the second contact surface, and in particular with respect to the stationary environment or mobile platform.

21 Claims, 10 Drawing Sheets

(51) Int. Cl.
  *B25J 19/00*    (2006.01)
  *B25J 19/02*    (2006.01)

(56) References Cited

U.S. PATENT DOCUMENTS

| | | | | |
|---|---|---|---|---|
| 5,428,713 | A * | 6/1995 | Matsumaru | B25J 9/1615 |
| | | | | 700/262 |
| 5,823,061 | A * | 10/1998 | Tomiyasu | B25J 9/047 |
| | | | | 901/23 |
| 6,323,615 | B1 | 11/2001 | Khairallah | |
| 8,631,720 | B2 * | 1/2014 | Nakagiri | B25J 19/0029 |
| | | | | 901/8 |
| 9,701,029 | B2 * | 7/2017 | Kawauchi | B25J 19/0079 |
| 9,895,800 | B2 * | 2/2018 | Asada | B25J 9/1694 |
| 11,161,135 | B2 * | 11/2021 | Clifford | B05B 16/95 |
| 2009/0114052 | A1 * | 5/2009 | Haniya | B25J 9/06 |
| | | | | 901/23 |

\* cited by examiner

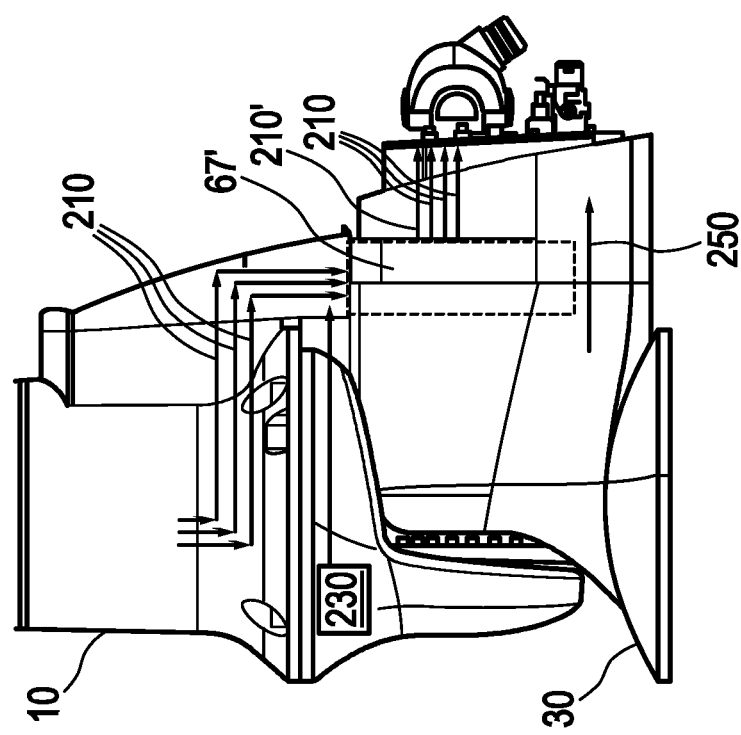
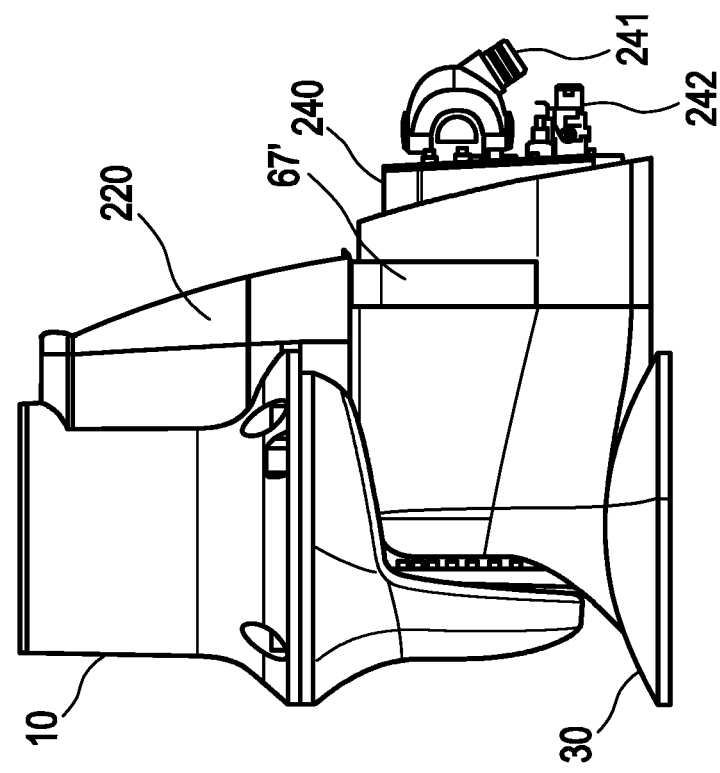
Fig. 12A
Fig. 12B

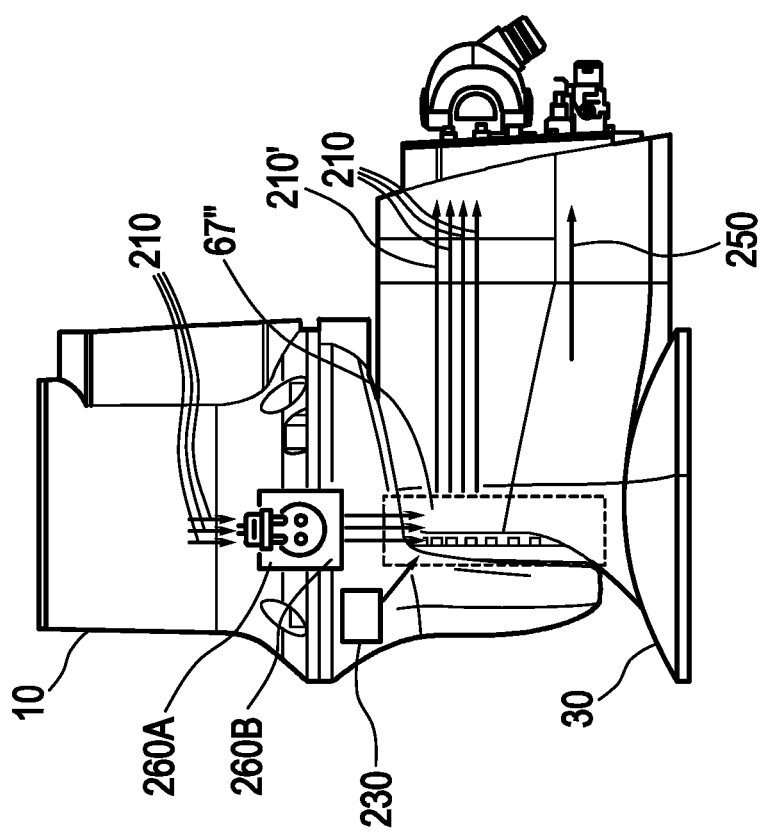
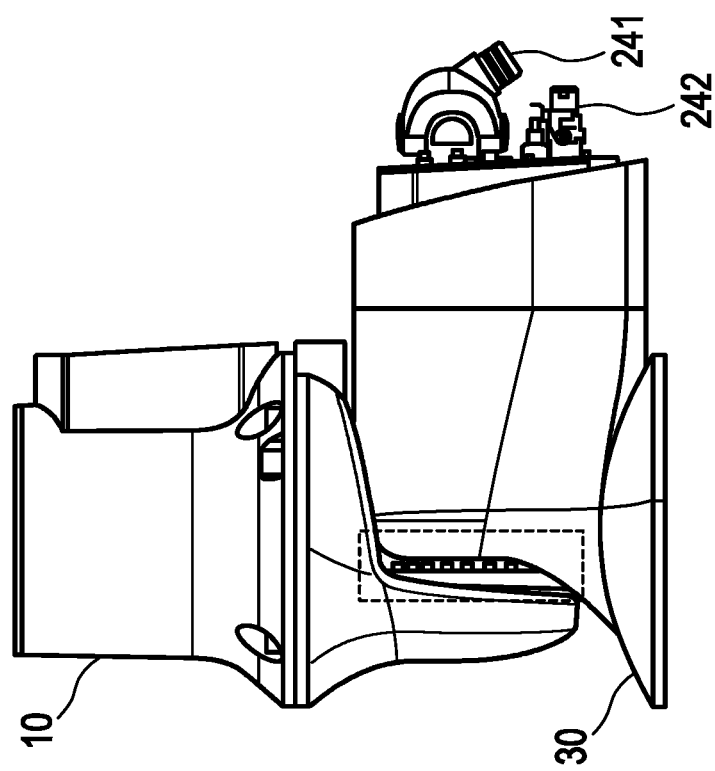

ROBOT

CROSS-REFERENCE TO RELATED APPLICATIONS

This application is a national phase application under 35 U.S.C. § 371 of International Patent Application No. PCT/EP2021/075055, filed Sep. 13, 2019 (pending), which claims the benefit of priority to German Patent Application No. DE 10 2020 211 480.3, filed Sep. 14, 2021, the disclosures of which are incorporated by reference herein in their entirety.

TECHNICAL FIELD

The present invention relates to a robot with a robotic arm and a robot joint module, a robot system with the robot, a robot joint module for the robot, as well as a method for mounting the robot and a method for operating the robot system.

BACKGROUND

Robots which have more joints or axes than necessary for approaching predetermined end-effector poses, e.g., one, two, or three-dimensional end-effector positions and/or one, two, or three-dimensional end-effector orientations—in particular, seven- or multi-axis robots—have the great advantage that, in contrast to kinematically determined robots, the same end-effector pose can be achieved in different robot positions.

As a result, obstacles in the working space can advantageously be circumvented, and/or the robot can advantageously operate in tightly limited environments such as, for example, between shelves, under low ceilings, (closely) against side walls, or the like.

However, a large part of conventional robot applications do not require a redundant design—in particular, not an at least seven-axis one.

On the one hand, the independent development or the acquisition of such a robot is therefore often not economical from the outset and, on the other, is highly advantageous for certain applications to be performed—possibly, only temporarily—and/or subsequently added.

SUMMARY

An object of one embodiment of the present invention is to improve a robot and/or its mounting and/or operation.

This object is achieved by a robot, a method, a robotic system having a robot, and a robotic joint module as described herein.

According to one embodiment of the present invention, a robot has a robotic arm with a base with a (proximal) base contact surface and a (distal) end-effector which is connected to the base via or by joints or (movement) axes which are connected by means of joint drives of the robotic arm (robotic arm joint drives) or can be actuated such that the end-effector has at least five—in one embodiment, at least, and in a further embodiment, exactly, six—degrees of freedom relative to the base actuated in particular by the joint drives.

In one embodiment, the robotic arm therefore has at least five, and in one development at least six, (actuated) joints or (movement) axes.

In one embodiment, one or more of the joints are pivot joints, and the robotic arm in one embodiment is in particular a five- or six-axis articulated robotic arm, or articulated-arm robot (arm).

Additionally or alternatively, two or more sequential joints have parallel joint axes—in particular, axes of rotation—and/or two or more sequential joints have joint axes—in particular, axes of rotation—which are perpendicular to each other and intersect in one embodiment.

In one embodiment, a joint axis closest to the base, and a joint axis of a joint of the robotic arm following the joint closest to the base, are perpendicular to each other, and preferably intersect each other. In addition or alternatively, this joint axis of a joint following the joint closest to the base, and a joint axis of a joint of the robotic arm following this (second closest to the base) joint, are parallel to each other.

A robot tool—in particular, a gripper—can be fastened to the end-effector—preferably non-destructively—in one embodiment, and in one embodiment is fastened.

Robotic arms with one or more of these features can be advantageously used independently in one embodiment, and therefore are particularly suitable for the present invention.

According to one embodiment of the present invention, the robot has a robot joint module comprising:
- a first contact surface which can be fastened to the base contact surface of the robotic arm—in one embodiment, releasably, and in particular form-fittingly and/or frictionally—and in a further embodiment by means of screws, couplings, quick-release fasteners, or the like, and in one embodiment is fastened, or is provided—in particular, set up or used—for this purpose;
- a second contact surface, to or with which the robot can be fastened to a stationary environment or mobile platform—in one embodiment, releasably, and in particular form-fittingly and/or frictionally—and in a further embodiment by means of screws, couplings, quick-release fasteners, or the like, and in one embodiment is fastened, or is provided—in particular, set up or used—for this purpose; and
- at least one robot joint module drive, by means of which, or with the help of which, the first contact surface can be pivoted or is pivoted against the second contact surface about a pivot axis, so that the end-effector of the robot, with respect to the second contact surface of the robot or its (proximal) robot joint module—in particular, the stationary environment or mobile platform—has at least six—in one embodiment, at least, and in one further embodiment, exactly, seven—degrees of freedom that are actuated (by the robotic arm joint drives and the robot joint module drive), or which is provided—in particular, set up or used—for this purpose. In one embodiment, the robot joint module therefore has a single degree of freedom that is actuated (by the robot joint module drive) and which corresponds to a pivoting degree of freedom of the first contact surface against the second contact surface about the pivot axis.

One embodiment of the present invention is based upon the idea of expanding or upgrading a—generally inexpensive—robotic arm—in particular, subsequently and/or optionally—that is modular in one embodiment, by means of the additional robot joint module to form a robot (arm) with the additional pivot axis of the robot joint module. Accordingly, in one embodiment, the pivot axis of the robot joint module forms an axis of the robot, which in turn can have an articulated-arm robot configuration as a whole. Likewise, a robot according to the invention can be reduced or retrofitted around the pivot axis by detaching the first from the base contact surface.

As a result, in one embodiment, (more) cost-effective robot arms can be developed and/or distributed and, optionally—in particular, already at the start or also subsequently—can be expanded with the robot joint module—in particular, to form redundant robots—which can offer in particular the advantages mentioned at the outset.

In this way, in particular the often uneconomical development of in-house—in particular, redundant—robots can be saved upon, or an—in particular, economically—advantageous robot can be made available.

Similarly, in one embodiment, a redundant robot can advantageously first be installed and then reduced or retrofitted to the pure robotic arm or around the pivot axis.

It can be profitable to expand standard five-axis robotic arms, which are already sufficient for many applications, with a robot joint module having at least one pivot axis to form (at least) six-axis robot (arms), which in one embodiment advantageously allow any positioning and orientation of the end-effector.

A six-axis robot arm, which advantageously allows any positioning and orientation of the end-effector and is therefore already sufficient for many applications, is particularly preferred for expansion with a robot joint module with at least, and preferably exactly, one pivot axis to form a seven- or multi-axis robot (arm), and particularly preferably a seven-axis robot (arm), which in one embodiment advantageously allows any positioning and orientation of the end-effector with or in different positions of the robot (arm) and therefore, in particular, a bypassing of obstacles and/or operation in narrowly limited environments such as, for example, between shelves, below low ceilings, (closely) against side walls, or the like.

In one embodiment, the robot is a stationary robot or is attached to the stationary environment, and in one embodiment to the floor, wall, or ceiling. Its working space, which, in contrast to mobile robots, is fixed, can be advantageously increased in one embodiment—in particular, a reach of the robot and/or its setup option can be improved in one embodiment.

In another embodiment, the robot has the mobile platform or is a mobile robot. In one embodiment, the mobile platform has a chassis—in particular, a chassis without rails or not bound to rails—in particular, one or more driven and/or steerable wheels, chains, or the like. As a result of expanding, according to the invention, the degrees of freedom of the robotic arm about the pivot axis between the robotic arm (base) and the mobile platform, it can, in one embodiment, be used or positioned particularly advantageously—in particular, in tightly limited spaces such as, for example, between shelves, under low ceilings, (closely) against side walls, or the like.

In one embodiment, the first contact surface is a one-piece surface or a single, cohesive surface, or a multi-part surface, or a surface with two or more sections which are spaced apart from one another—in particular, separated by a gap and/or formed on different structures. In one embodiment, the first contact surface is at least regionally planar and/or has one or more steps.

In one embodiment, the second contact surface is a one-piece surface or a single, cohesive surface, or a multi-part surface, or a surface with two or more sections which are spaced apart from one another—in particular, separated by a gap and/or formed on different structures. In one embodiment, the second contact surface is at least regionally planar and/or has one or more steps.

In one embodiment, the base contact surface is a one-piece surface or a single, cohesive surface, or a multi-part surface, or a surface with two or more sections which are spaced apart from one another—in particular, separated by a gap and/or formed on different structures. In one embodiment, the base contact surface is at least regionally planar and/or has one or more steps.

As a result, in one embodiment, the fastening of the robot (arm)—in particular, its stability and/or reliability—can be improved.

In one embodiment, the pivot axis of the robot joint module is arranged on a side, facing away from the robotic arm, of the first contact surface.

Additionally or alternatively, in one embodiment, the pivot axis of the robot joint module—in particular, when mounting the robot on a floor or ceiling—is a horizontal axis, or horizontal when the robot is placed on a flat floor, or on a flat floor or horizontal mobile platform. In one embodiment, the robot or the second contact surface is attached to a floor or a ceiling of the environment, or is configured or used for this purpose.

In addition or alternatively, the pivot axis of the robot joint module is inclined in one embodiment by at least 60 degrees and at most 120 degrees—in particular, at least 75 degrees and/or at most 105 degrees, and in one embodiment by 90 degrees—relative to a joint axis—in particular, a rotational axis—of a joint of the robotic arm closest to the base, wherein said joint axis of a joint of the robotic arm closest to the base is, in one embodiment, a vertical joint axis, or is vertical when the robot is set up, or when on a level floor or horizontally-standing mobile platform.

In addition or alternatively, in one embodiment, the pivot axis of the robot joint module intersects one—in particular, this—joint axis—in particular, joint rotational axis—of a or the joint of the robotic arm closest to the base.

Additionally or alternatively, in one embodiment, the pivot axis of the robot joint module overlaps the first contact surface and/or the second contact surface—in particular, in one embodiment, the pivot axis crosses an outer contour of the first and/or second contact surface or overlaps it—in one embodiment, (always) at a distance from this outer contour. In other words, in one embodiment, the pivot axis does not lie laterally next to the first or second contact surface.

Additionally or alternatively, the pivot axis in one embodiment is parallel to the first contact surface and/or to the second contact surface.

In one embodiment, this results in a particularly advantageous—in particular, (more) compact—(overall) kinematics of the robot—particularly advantageously in combination with two or more of the aforementioned features.

In one embodiment, a joint axis—in particular, a rotational axis—of a joint of the robotic arm following, or next to, the joint closest to the base or second closest to the base in at least one position or pose—in particular, a zero position—of the robotic arm—in particular, of its joint axis closest to the base—is inclined by at most 30 degrees with respect to the pivot axis of the robot joint module, and, in another embodiment, is parallel (in this position of the robotic arm) to the pivot axis of the robot joint module.

In one embodiment, this can advantageously increase the reach of the robot (arm).

In one embodiment, an—in particular, this—joint axis—in particular, a rotational axis—of a joint of the robotic arm following, or next to, the joint closest to the base or second closest to the base in at least one position or pose—in particular, a zero position—of the robotic arm—in particular, of its joint axis closest to the base—is inclined by at least 60 degrees and at most 120 degrees with respect to the pivot axis of the robot joint module, and, in another embodiment, is perpendicular (in this position of the robotic arm) to the pivot axis of the robot joint module.

In one embodiment, this makes it possible to achieve particularly advantageous mobility of the robot (arm), and in particular make it easier to circumvent obstacles.

In one embodiment, the first contact surface of the robot joint module and the base contact surface of the robotic arm are designed—in particular, matched with each other—in such a way that they can be fastened to each other, alternatively, in at least two orientations offset from each other—in particular, by at least 45 degrees and/or at most 135 degrees, i.e., in particular, in at least two orientations offset from each other by 90 degrees. In one embodiment, the first contact surface of the robot joint module and the base contact surface of the robotic arm are designed—in particular, matched with each other—such that they can be fastened to one another only in discrete orientations.

In one embodiment, the first contact surface of the robot joint module and the base contact surface of the robotic arm each have a corresponding hole pattern and/or correspondingly distributed or arranged projections or recesses, wherein, in one, two, or more of the mutually-offset orientations, at least one projection engages in a recess, and/or the first and base contact surfaces can be or are screwed to one another by means of screws passing through holes in their hole patterns.

In one embodiment, the robotic arm can thereby be expanded by a particularly suitable or advantageous, proximal pivot axis as required.

In one embodiment, the first and second contact surfaces of the robot joint module, with and/or without a fastened robotic arm, are pivotable by at most ±90 degrees or at most less than ±90 degrees—in particular, by at most ±85 degrees or at most less than ±85 degrees—in one embodiment, by at most ±80 degrees or at most less than ±80 degrees- and in one embodiment, a (maximum) pivot range of the pivot axis is correspondingly limited—in one embodiment, structurally or in a form-fitting manner—in particular, by stops, and/or by controlling—in particular, with the aid of one or more—in particular, contactless—sensors. In other words, in one embodiment, a (maximum) pivot range of the pivot axis is correspondingly limited to less than or equal to 180 degrees—in particular, less than or equal to 170 degrees—in one embodiment, less than or equal to 160 degrees, in one embodiment, in a structurally or form-fitting manner—in particular, by stops, and/or by controlling—in particular, with the aid of one or more—in particular, contactless—sensors.

In one embodiment, this can reduce the risk of pinching by the robot joint module.

In one embodiment, the first and second contact surfaces of the robot joint module with and/or without an attached robotic arm can pivot relative to each other by ±120 degrees or more than ±120 degrees—in particular, by ±150 degrees or more than ±150 degrees—and in one embodiment, by more than ±360 degrees.

In one embodiment, this can advantageously increase the working range of the robotic arm.

In one embodiment, the first and second contact surfaces are parallel to one another—in particular, only in a pivot position (about the pivot axis)—and/or are or tilted or inclined relative to each other in at least one pivot position (about the pivot axis).

In one embodiment, this can advantageously realize both an orientation of the robotic arm of the robot, expanded with the robot joint module, relative to the environment or mobile platform that corresponds to the orientation of the robotic arm attached to the environment or mobile platform without the robot joint module, as well as several additional orientations.

In one embodiment, the first contact surface is arranged on an L-flange, wherein, in one embodiment, a bar of the L-flange can be perpendicular, and/or a bar of the L-flange can be parallel, to the pivot axis. Additionally or alternatively, in one embodiment, the second contact surface is arranged on an L-flange, wherein, in one embodiment, a bar of the L-flange can be perpendicular, and/or a bar of the L-flange can be parallel, to the pivot axis.

In one embodiment, a structurally (more) compact and/or (more) stable robot joint module can thereby be realized.

In one embodiment, the second contact surface of the robot joint module is designed in such a way that it can (alternatively) be attached to the same interface or mating surface—in particular, the environment or mobile platform—instead of the base contact surface of the robotic arm.

In a development, a hole pattern of the second contact surface is designed in such a way that it can be screwed, in place of a hole pattern of the base contact surface, with the same screw distribution or the same screw pattern, with one or more screws; in particular, the hole pattern of the second contact surface can correspond to the hole pattern of the base contact surface.

In addition or alternatively, in one development, a projection distribution or a projection pattern with one or more projections of the second contact surface can be inserted into the same recess distribution or recess pattern instead of a projection distribution or a projection pattern with one or more projections of the base contact surface—in particular, in a form-fitting manner—and/or a recess distribution or recess pattern of the second contact surface can be placed, in place of a recess distribution or recess pattern of the base contact surface—in particular, in a form-fitting manner—on the same projection distribution or projection pattern with one or more projections.

In one embodiment, the robot according to the invention or its proximal second contact surface can be attached to the environment or mobile platform in place of the robotic arm or its proximal base contact surface or a similar robotic arm, and the robotic arm can therefore be advantageously expanded around the pivot axis in an existing robot cell or on an existing mobile platform, or, conversely, the robotic arm or its proximal base contact surface can be attached to the environment or mobile platform in place of the proximal second contact surface, and therefore the robot can be advantageously reduced about the pivot axis in an existing robot cell or on an existing mobile platform.

In one embodiment, a height H between the first and second contact surfaces, when the first contact surface (in a (pivot) position) is (pivoted) parallel to the second contact surface, is at most 1.5 times—in one embodiment, at most 1.25 times and/or at least 0.75 times—in particular, at least 0.85 times—a maximum width D of the first or second contact surface—in particular, a diameter or the maximum distance between two points of the first or second contact surface ($H \leq 1.5 \cdot D$, in one embodiment $H \leq 1.25 \cdot D$ and/or $0.75 \cdot D \leq H$, and, in one development, $H \leq 1.25 \cdot D$ and/or $0.85 \cdot D \leq H$).

As a result, in one embodiment, an optimal mobility of the robot joint module or about the pivot axis can be realized with a compact size.

In one embodiment, at least one motor of the robot joint module drive is arranged between the first and second contact surfaces and/or an electric motor.

Additionally or alternatively, in one embodiment, the first contact surface overlaps the robot joint module drive—in particular, in one embodiment, an outer contour of the first contact surface crosses an outer contour of the robot joint module drive—in one embodiment, at a distance therefrom. In one development, the first contact surface covers or projects beyond at least one motor of the robot joint module drive.

As a result, in one embodiment, an optimal mobility of the robot joint module or about the pivot axis can be realized with a compact size.

In one embodiment, the first and second contact surfaces are offset relative to one another in the direction of the pivot axis, and, in one development, they are arranged on opposite sides of a normal plane to the pivot axis. In one embodiment, mobility about the pivot axis can be increased as a result.

In one embodiment, an outer contour of the first contact surface of the robot joint module and an outer contour of the base contact surface deviate by at most 10 percent, and preferably at most 5 percent, from each other. This is understood in one embodiment to mean that a length of the outer contour of the first contact surface and a length of the outer contour of the base contact surface deviate from each other by at most 10 percent, and preferably at most 5 percent, of one or the other length, and/or that the outer contour of the first contact surface lies both within an outer contour, which is at a constant distance from the outer contour of the base contact surface and is longer than the outer contour of the base contact surface by 10 percent, and preferably at most 5 percent, and also within an outer contour which is at a constant distance from the outer contour of the base contact surface and is shorter than the outer contour of the base contact surface by 10 percent, and preferably at most 5 percent.

In addition or alternatively, an in particular flexible, single-part, or multi-part cover—in particular, an apron or the like—is arranged (in each case) on the robot joint module—in one embodiment, on its first contact surface, and/or on the robotic arm, in one embodiment, on its base contact surface—said cover completely or partially covering a gap between the base contact surface and the first contact surface attached thereto, or is provided—in particular, set up or used—for this purpose.

In one embodiment, this can reduce the likelihood of snagging between the first and base contact surfaces in each case, and particularly in combination.

In one embodiment, the robot has a robotic arm side and/or robot joint module side detection device, which—in particular, by sensors and/or touching, and in particular mechanically and/or electrically, or contactlessly, and in particular optically, magnetically, and/or electrically—detects the base contact surface (or its presence) on the first contact surface and/or a position and/or orientation of the base contact surface relative to—in particular, on—the first contact surface, or is provided—in particular, set up or used—for this purpose.

In one development, the detection device has one or more magnets, magnetic (field) sensors, pushbuttons, radio transmitters or receivers on the robotic arm side (provided for this purpose—in particular, set up or used), and/or one or more magnets, magnetic (field) sensors, pushbuttons, radio transmitters or receivers—in one embodiment, NFC transmitters or receivers—in particular, RFID transmitters or receivers (provided for this purpose—in particular, set up or used)—on the robot joint module side.

In one embodiment, this can improve safety and/or starting up.

In one embodiment, the robot has a detection device on the robot joint module side, which monitors—in particular, by sensor and/or contactlessly—in one embodiment, optically, and in particular by means of laser, capacitively, and/or by means of ultrasound—a safety region around the robot joint module—in particular, on the side of, and, in one embodiment, on both sides of, the pivot axis—or is provided—in particular, set up or used—for this purpose.

In one embodiment, this can reduce the likelihood of pinching when pivoting about the pivot axis.

In one embodiment, the robot joint module, and in one embodiment, the robot joint module drive, has a brake—in one embodiment, a mechanical, hydraulic, and/or electrical—in particular, electromagnetic—brake—that brakes the pivot axis—in one embodiment, decelerates and/or fixes, or acts as a parking brake of, the pivot axis—or is provided—in particular, set up or used—for this purpose.

As a result, in one embodiment, the operation—in particular, the safety and/or energy consumption—can be improved.

In one embodiment, the robot joint module has a detection device that detects one or more joint forces and/or joint torques—in particular, along the pivot axis or about the pivot axis and/or transverse to the pivot axis—or is provided—in particular, set up or used—for this purpose—in particular, one or more drive-side joint torque sensors and/or one or more output-side joint torque sensors.

In one embodiment, this can improve operation—in particular, (actuation) control and/or safety—in particular, if, in one embodiment, the robotic arm additionally or alternatively has a detection device for one or more of its joints, which detects one or more joint forces and/or joint torques at or in the (respective) joint, or is provided—in particular, set up or used—for this purpose—in particular, one or more joint torque sensors on the drive side and/or one or more joint torque sensors on the output side. In one embodiment, signals from the detection device on the robot joint module side and from the detection device(s) on the robotic arm side are evaluated together, or used for controlling and/or monitoring the robot.

In one embodiment, the robot joint module has drive electrics for operating the robot joint module drive—in one embodiment, at least one position and/or velocity sensor for detecting a position or velocity of the pivot axis—at least one converter and/or evaluation electronics—in particular, for the aforementioned joint force and/or joint torque detection device and/or the position or velocity sensor—safety electronics for monitoring the robot joint module, an adjustment sensor for detecting an adjustment position of the pivot axis, and/or a cooling device—in particular, an external heat sink and/or one or more cooling fins for cooling one or more of these components.

In one embodiment, the heat sink has one or more cooling fins. In addition or alternatively, in one embodiment, one or more electronic components—in particular, power electronic components—are at least partially arranged in the heat sink, and/or one or more external connections—in particular, external signal, media, and/or power connections of the robot—in particular, of the robotic arm and/or the robot joint module—are arranged on the heat sink. In one embodiment, this allows operation to be improved and/or the robot to be designed (more) compactly.

Additionally or alternatively, in one embodiment, an accuracy—in particular, positioning or repeatability accuracy—of the robot joint module drive corresponds to at least that of at least one of the robotic arm joint drives, and/or a sensitivity of the robot joint module drive corresponds to at least that of at least one of the robotic arm joint drives, and/or a safety of the robot joint module drive corresponds to at least that of at least one of the robotic arm joint drives.

In one embodiment, this allows the pivot axis or the robot joint module drive to be, particularly advantageously, also controlled by or integrated into a robot controller that controls the robotic arm joint drives, or allows the robot joint module to be added or removed in a modular fashion. In the present case, control is also understood to mean, in particular, regulate.

In one embodiment, the robot joint module has at least one conductor guide which guides at least one single-channel or multi-channel conductor for supplying the, and/or communicating with the, robot joint module—in particular, the robot joint module drive, and/or at least one robot joint module-side or robot joint module sensor—in particular, a torque sensor or the like on the drive or output side—in particular, form-fittingly and/or frictionally—or is provided—in particular, set up or used—for this purpose (robot joint module conductor guide).

In addition or alternatively, in one embodiment, the robot joint module has at least one conductor guide which guides at least one single-channel or multi-channel conductor attached to the robotic arm—in one embodiment, for supplying at least one, and/or communicating with at least one, robotic arm joint drive and/or robotic arm side or robotic arm sensor and/or tool arranged on the end-effector—in particular, form-fittingly and/or frictionally—or is provided—in particular, set up or used—for this purpose (robotic arm conductor guide).

In one embodiment, the robot joint module conductor guide and/or the robotic arm conductor guide can be rotated about the pivot axis of the robot joint module. In one embodiment, this can advantageously reduce torsion of the conductor when pivoting about the pivot axis.

In one embodiment, the robot joint module conductor guide and/or the robotic arm conductor guide is rotationally fixed, relative to the robot joint module, about the pivot axis of the robot joint module. In one embodiment, this can advantageously reduce a movement of the conductor relative to the robot joint module, which is in particular difficult to predict, or unexpected.

In one embodiment, the robot joint module conductor guide and/or the robotic arm conductor guide guides the (respective) conductor at least sectionally parallel to the pivot axis, and, in one embodiment, the robot joint module conductor guide and/or the robotic arm conductor guide or a section of the conductor guided thereby is aligned with the pivot axis. In one embodiment, this can advantageously reduce a movement of the conductor when pivoting about the pivot axis.

In one embodiment, the robot joint module conductor guide and/or the robotic arm conductor wrap around the pivot axis of the robot joint module at least sectionally—in one embodiment, by or at least 45 degrees, and in particular at least 90 degrees. In one embodiment, this can advantageously reduce torsion of the conductor when pivoting about the pivot axis.

In one embodiment, the robot joint module guide and/or the robotic arm guide has at least one predetermined separation point, which, in one development, has a non-destructively detachable—in particular, friction-locking and/or magnetic—connection between two separation interfaces and/or a predetermined breaking point. In one embodiment, this can prevent damage to the (respective) conductor.

In one embodiment, at least one single-channel or multi-channel conductor of the robotic arm—in one embodiment, at least one single-channel or multi-channel conductor for supplying at least one, and/or communicating with at least one, robotic arm-side or robotic arm sensor, and/or robotic arm joint drive, and/or a tool arranged on the end-effector—is guided into the robot joint module—in one embodiment, guided therethrough—and/or has one or more plug-in connections between the robotic arm and robot joint module and/or one or more sliding contacts between robotic arm and robot joint module.

In one embodiment, the conductor of the robotic arm is guided into the robot joint module within a single-part or multi-part cover. The cover is stationary relative to the base in one embodiment, and attached to it in one embodiment.

Additionally or alternatively, the conductor of the robotic arm in one embodiment is guided in or through a cable guide drum which, in one embodiment, is fixedly connected to the robotic arm, in one development, is fixedly connected or integrally formed with the cover, and, in another embodiment, is arranged in the interior of the robot joint module.

In one embodiment, at least one conductor for supplying the, and/or communicating with the, robot joint module—in particular, the robot joint module drive and/or at least one robot joint module side or robot joint module sensor—is also guided in or through the cable guide drum, and/or has a connection point which is arranged, together with a connection point of the at least one conductor of the robotic arm, in a common external connection of the robot joint module—in one embodiment, of its heat sink.

In one embodiment, the, or one or more of the, plug-in connections (each) have at least one plug connector on the robotic arm side and at least one mating connector on the robot joint module side, and/or are closed or are configured, and, in one embodiment, arranged, to be closed when or by attaching the first contact surface to the base contact surface. In one embodiment, the, or one or more of the, plug connectors on the robotic arm side of the, or one or more of the, plug-in connections are (each) arranged on the base contact surface, and/or the, or one or more of the, mating connectors on the robotic arm side of the, or one or more of the, plug-in connections are (each) arranged on the first contact surface.

One or more of the conductors mentioned here can, in particular, be electrical conductors for transmitting digital and/or analog signals, or supply conductors—in particular, electrical conductors for supplying power—or fluid (supply) conductors—in particular, for supplying hydraulic and/or pneumatic media—in particular, water, oil, (compressed) air, or the like—to a tool arranged on the end-effector.

By one or more of the aforementioned features, in one embodiment, operation can be improved—in particular, the risk of damage to a conductor can be reduced—and/or the assembly of the robot can be improved—in particular, simplified.

According to one embodiment of the present invention, a robot system has a robot described herein and, in one embodiment, a centralized or common or integrated robot controller which jointly controls the robotic arm joint drives of the robotic arm and the robot joint module drive of the robot joint module, or is provided—in particular, set up or used—for this purpose.

In one embodiment, the robot controller adjusts the pivot axis of the robot joint module or the robot joint module drive and the joint axis of one or more joints of the robotic arm or its robotic arm joint drives simultaneously, or is provided—in particular, configured or used—for this purpose.

In one embodiment, the robot controller controls the robotic arm joint drives of the robotic arm and the robot joint module drive of the robot joint module, or adjusts their joint axes or drives, on the basis of a kinematics model—in particular, one stored in the robot controller—which has the pivot axis of the robot joint module and the joint axes of the joints of the robotic arm—in particular, their positions and/or orientations relative to one another and/or their control parameters, such as adjustment ranges. In one embodiment, the kinematics model can have an elastic and/or dynamic model, which has deformation parameters—in particular, stiffnesses, load-related elastic deformations, or the compensation thereof or the like (elastic model), or inertia parameters—in particular, masses, centroids, mass moments of inertia, or the like (dynamic model). In one embodiment, the kinematics model is a continuous or uniform model.

This is based upon the idea explained at the beginning of modularly expanding a robotic arm by means of a robot joint module into a robot with at least—in one embodiment, exactly—one additional axis, and then using it as a unified robot—in particular, to control it.

According to one embodiment of the present invention, a robot joint module described herein for a robot described herein—in particular, of a robot described herein—and/or a use of a robot joint module described herein for the expansion described herein of a robotic arm described herein into a robot described herein—in particular, by attaching the base contact surface to the first contact surface—and/or for reducing a robot to a robotic arm described herein—in particular, by detaching the base contact surface from the first contact surface—is under protection.

According to one embodiment of the present invention, for mounting a robot described herein, the first contact surface is in particular releasably fastened to the base contact surface, and/or—in particular, beforehand, simultaneously, or subsequently—the second contact surface is fastened to the stationary environment or mobile platform.

By first attaching the first contact surface to the base contact surface and then attaching the second contact surface to the stationary environment or mobile platform, the expanded robot can advantageously be used—in particular, installed—as a complete robot from the start. Conversely, by attaching the second contact surface to the stationary environment or mobile platform and simultaneously or subsequently attaching the first to the base contact surface, installation can advantageously be done in stages, and/or the robotic arm can be used independently elsewhere for even longer.

In one embodiment, prior to attaching the first contact surface to the base contact surface, initially, the base contact surface is detached from the stationary environment or mobile platform, and then the second contact surface is attached to the stationary environment or mobile platform, instead of the base contact surface.

In addition or alternatively to the expansion of the robotic arm with the robot joint module into the robot, according to one embodiment of the present invention, the base contact surface is detached—in particular, again—from the first contact surface, which is also referred to herein in generalized terms as mounting the (reduced or retrofitted) robot (arm). Additionally or alternatively, according to one embodiment of the present invention—in particular, subsequent to this detachment of the base contact surface from the first contact surface—the base contact surface of the robotic arm is, in one embodiment, releasably and/or in place of the second contact surface, attached to the stationary environment or mobile platform. This underscores a modular or alternative—in particular, alternating—use of the robot according to the invention with or without a robot joint module according to the present invention.

In one embodiment, the presence of the base contact surface on the first contact surface and/or a position and/or orientation of the base contact surface relative to—in particular, on—the first contact surface is detected automatically in whole or in part—in one embodiment, at least in part by or with the aid of the robot joint module and/or by or with the aid of the robotic arm.

In one development, a detection device on the robotic arm side detects—in particular, by a sensor—the first contact surface or its presence on the base contact surface and/or the position and/or orientation of the first contact surface relative to the base contact surface, and/or a detection device on the robot joint module side detects—in particular, by a sensor—the base contact surface or its presence on the first contact surface and/or the position and/or orientation of the base contact surface relative to the first contact surface.

In one embodiment, this detection comprises mechanical, electrical—in particular, capacitive—magnetic—in particular, magnetic field sensory—and/or optical detection.

In one development, at least one magnetic field sensor on the robotic arm side detects one or more magnets on the robot joint module side, and/or at least one magnetic field sensor on the robot joint module side detects one or more magnets on the robotic arm side.

In addition or alternatively, in one development, at least one radio receiver on the robotic arm side—in particular, an NFC radio receiver, and, in one embodiment, an RFID radio receiver—detects radio signals from one or more transmitters—in particular, antennas—on the robot joint module side, and/or at least one radio receiver on the robot joint module side—in particular, NFC radio receiver, and, in one embodiment, RFID radio receiver—detects radio signals from one or more transmitters—in particular, antennas—on the robotic arm side.

In one embodiment, detecting an alignment of the base contact surface relative to the first contact surface comprises adjusting the pivot axis and/or a—in particular, horizontal—joint axis—in particular, rotational axis—of at least one robotic arm joint, detecting a load change caused thereby—in particular, about the pivot axis and, if necessary, comprises adjusting the joint axis of the robotic arm joint after—rotation of the robotic arm relative to its base contact surface—in particular, by 90 degrees—detecting a load change caused thereby—in particular, about the pivot axis—and determining the alignment on the basis of this/these detected load change(s).

If, for example, the robotic arm is fastened in a vertical candle position to the first contact surface of the robot joint module, and then the robotic arm is bent in a horizontal joint axis, this causes a load change about the pivot axis, provided that this and the horizontal joint axis are not perpendicular to one another. This change in load can be detected by a joint torque sensor of the robot joint module, and therefore the orientation of the first contact surface relative to the base contact surface can be determined therefrom, e.g., an orientation of the horizontal joint axis of the robotic arm parallel to the pivot axis, as well as its direction of rotation.

If the pivot and horizontal joint axis are perpendicular to one another, the detected load change about the pivot axis is equal to zero. The horizontal joint axis can then be rotated in the candle position about a vertical axis, e.g., by 90 degrees, and then the robotic arm can be bent again in the horizontal joint axis, which is now no longer perpendicular to the pivot axis, so that, as described above, the orientation of the first contact surface relative to the base contact surface can now be determined.

In one embodiment, the, or the presence of the, base contact surface on the first contact surface, and/or a position and/or orientation of the base contact surface relative to the first contact surfaces, is manually entered.

In one embodiment, the detected or entered position and/or orientation of the base contact surface relative to the first contact surface, and/or the, or the presence of the, base contact surface at the first contact surface is, in one embodiment, when controlling the robot, and, in one embodiment, in the kinematic model of the robot controller, taken into account, and, in one embodiment, is saved, wherein, in one embodiment, the kinematic model is parameterized or updated on the basis of this detected or entered data. For example, the forward and/or backward transformation for transforming between joint and Cartesian coordinates can differ depending upon the orientation of the base contact surface relative to the first contact surface.

In one embodiment, the robot is calibrated after the attachment of the base contact surface to the first contact surface and/or the second contact surface to the environment or mobile platform, and/or after detaching the base contact surface from the first contact surface and/or fastening the base contact surface to the environment or mobile platform, instead of the second contact surface.

In one embodiment, this can improve the positioning accuracy of the (expanded or reduced) robot.

In one embodiment, one or more—in particular, all—steps of a method described herein are carried out completely or partially automatically—in particular, by the robot controller.

It is understood that the (attachment) or a presence of the base contact surface at the first contact surface, or a position and/or orientation of the base contact surface relative to the first contact surface, includes the (attachment) or a presence of the first contact surface at the base contact surface, or a position and/or orientation of the first contact surface relative to the base contact surface.

In one embodiment, the robot (with the robot joint module) and the robotic arm alone possess (have) and/or fulfill the same requirements regarding operating voltage, safety (category), transmitter system, (actuation) control, and/or sensors.

In one embodiment, the robot controller controls or is arranged to control or is used to control the robot based upon or as a function of a base contact surface detected (by the corresponding detection device) at the first contact surface and/or position and/or orientation of the base contact surface relative to the first contact surface, and/or as a function of a monitoring of a safety region (by the corresponding detection device). In one embodiment, the robot controller limits or prevents pivoting about the pivot axis when an obstacle is detected in the safety region.

In one embodiment, the robot controller moves or adjusts the pivot axis or the robot joint module drive—preferably together or jointly with the joint axis of at least one joint of the robotic arm or its robotic arm joint drive, and/or on the basis of the continuous kinematics model—in particular, a continuous (forward and/or backward) transformation between the joint or axis space and the Cartesian or work space—in order to guide the end-effector into a predetermined pose and/or on a predetermined path—in particular, to transport a workpiece and/or to approach or depart from a machining position or path—or is set up or used for this purpose.

One or more projections mentioned here are, in one embodiment, formed integrally with the corresponding element or the corresponding surface. In this way, in one embodiment, a particularly stable connection can be realized.

One or more projections mentioned herein are, in one embodiment, connected permanently—in particular, integrally—to the corresponding element or the corresponding surface. In this way, a reliable connection can, in one embodiment, be combined with advantageous manufacturing.

In one embodiment, one or more projections mentioned herein can be connected or joined to the corresponding element or corresponding surface in a non-destructively detachable manner—in particular, form-fittingly and/or frictionally. In one embodiment, this allows for easy (un)mounting.

One or more permanently connected projections mentioned herein and/or one or more projections mentioned herein that are releasably connected in a non-destructive manner have, in one embodiment, at least one, separately manufactured pin—in particular, may be such. Integrally-formed projections can also advantageously be formed in the shape of a pin.

Accordingly, in one embodiment, for example, a projection distribution of the second contact surface may have—in particular, consist of—one or more projections integrally formed with the second contact surface and/or one or more projections permanently, and/or one or more projections non-destructively releasably, connected to the second contact surface—in particular, pins—in one embodiment, locating pins—and/or a projection distribution of the base contact surface can have—in particular, consist of—one or more projections integrally formed with the base contact surface and/or one or more projections permanently, and/or one or more projections non-destructively releasably, connected to the base contact surface—in particular, pins—in one embodiment, locating pins.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 12A shows a part of a robot according to a further embodiment of the present invention in an illustration corresponding to FIG. 5;

FIG. 12B shows the part of the robot of FIG. 12A with conductors;

FIGS. 14A, 14B show a part of a robot according to a further embodiment of the present invention in an illustration corresponding to FIGS. 12A, 12B.

DETAILED DESCRIPTION

Figure 1:
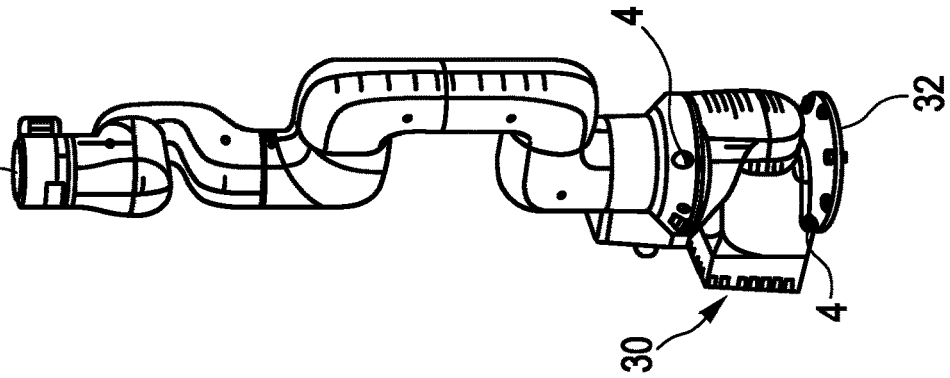
FIG. 1 illustrates an exemplary robot according to one embodiment of the present invention in candle position.

FIG. 1 shows a robot according to one embodiment of the present invention in candle position.

Figure 8:
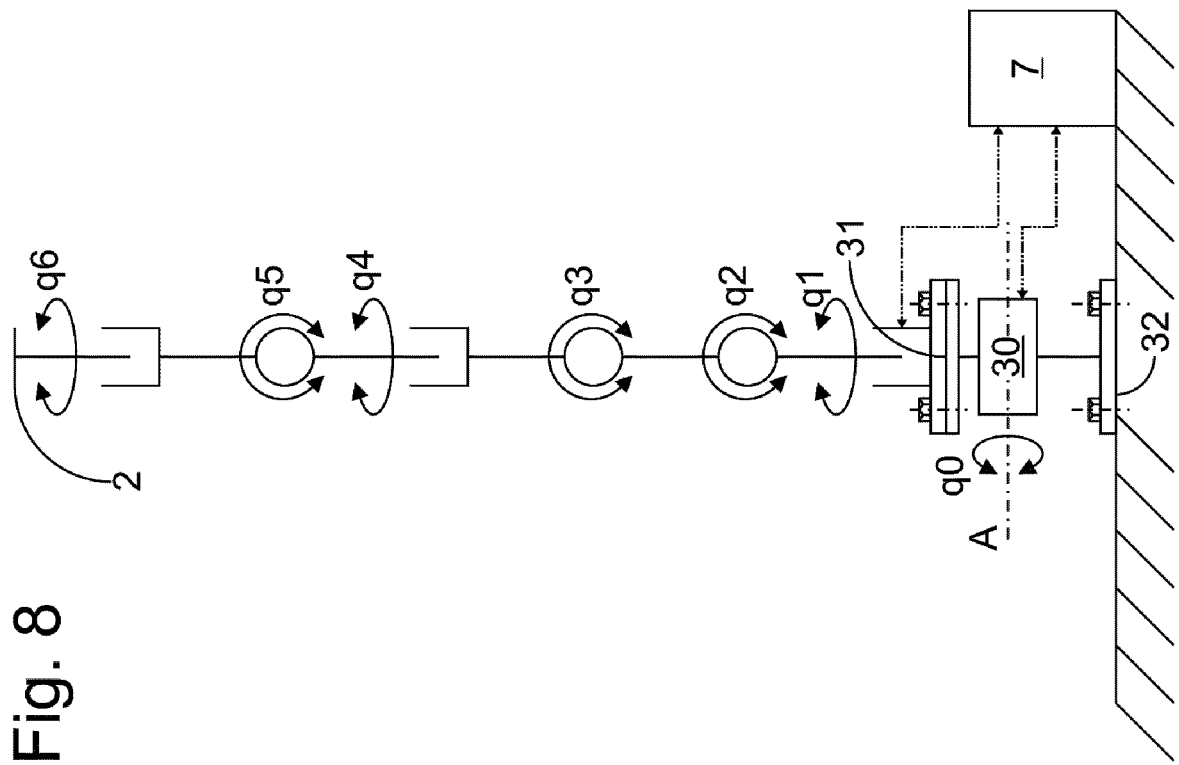
FIG. 8 schematically depicts the kinematic design of the exemplary robot in an orientation of the first contact surface rotated by 90°, compared to the orientation of FIG. 7, relative to the base contact surface.
Figure 7:
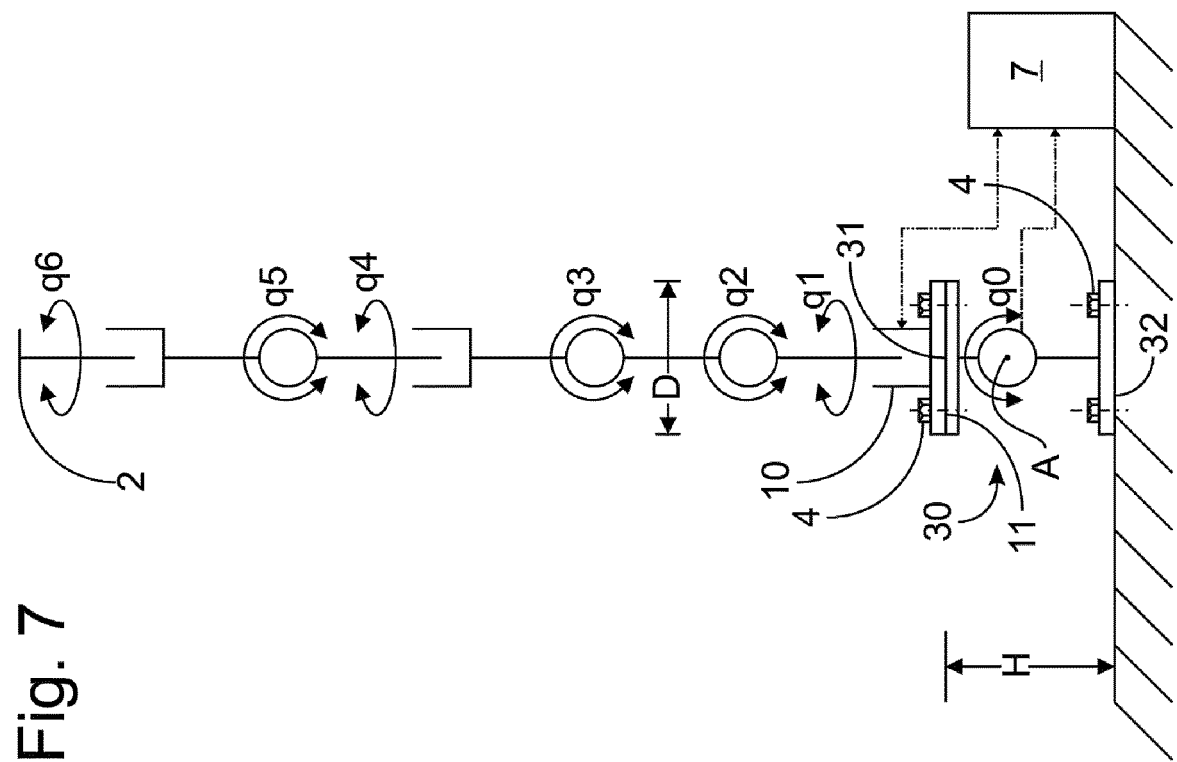
FIG. 7 schematically depicts the kinematic design of the exemplary robot in a first orientation of a first contact surface of the robot joint module relative to a base contact surface of the robotic arm.
Figure 9:
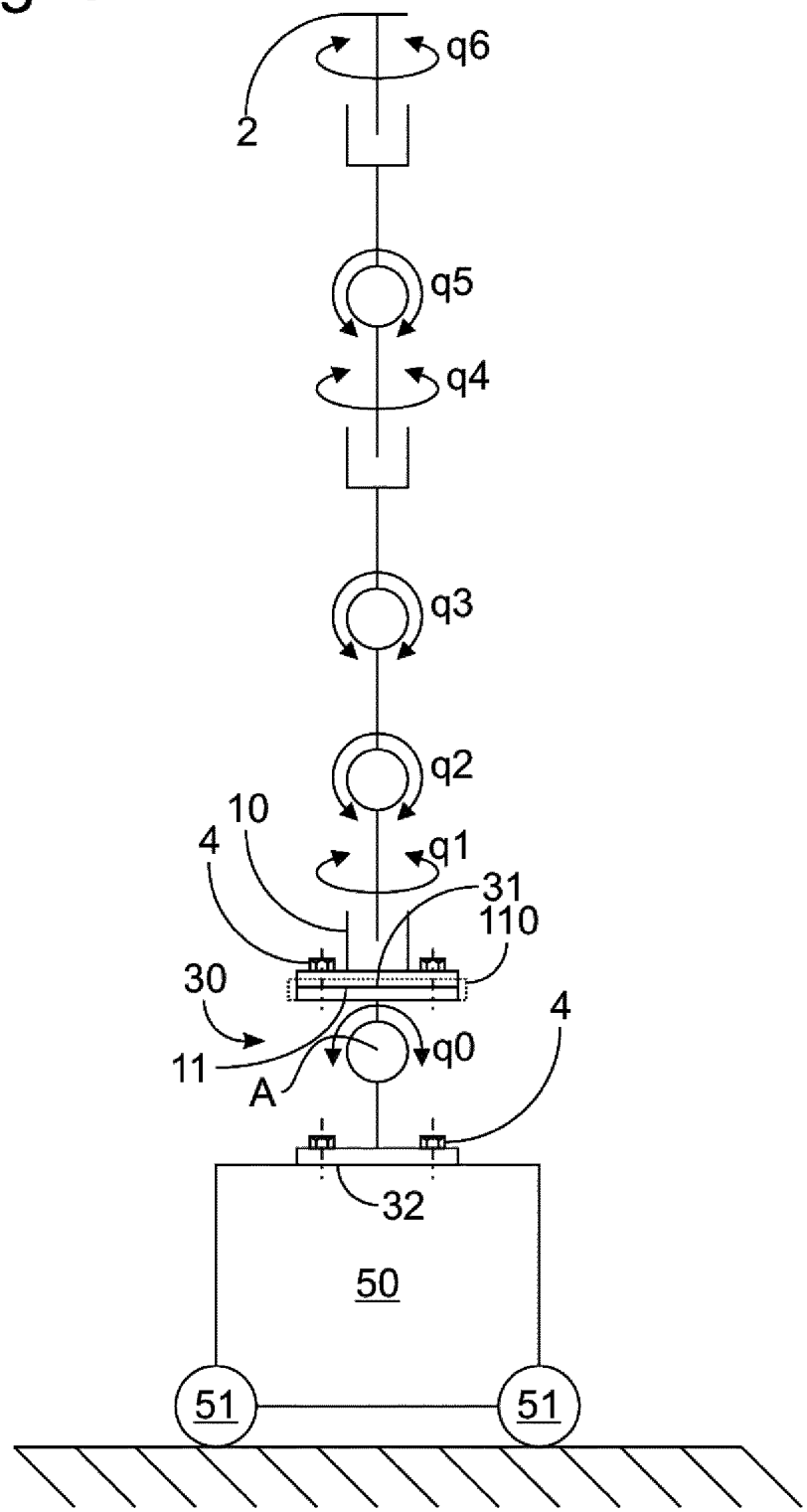
FIG. 9 schematically depicts the kinematic design of the exemplary robot during assembly on a mobile platform.

The robot has a six-axis articulated-arm robotic arm or robot articulated arm, which has a base 10 with a base contact surface 11 (cf. FIG. 7) and an end-effector 2 which is connected to the base 10 via six pivot joints which, with the aid of the robotic arm joint drives, are adjustable such that the end-effector 2 has six actuated degrees of freedom relative to the base 10, as indicated in the kinematic schematic representations of FIGS. 7-9 by the corresponding joint angles q1-q6.

The robot has a robot joint module 30 having a first contact surface 31 detachably attached to the base contact surface 11 by means of screws 4, a second contact surface 32 detachably attached to a stationary environment by means of screws 4, and a robot joint module drive for pivoting the first contact surface against the second contact surface about a pivot axis A, so that the end-effector 2 has seven actuated degrees of freedom relative to the second contact surface 32 or stationary environment, respectively, as indicated in FIGS. 7, 8 by the pivot angle q0 about the pivot axis A.

In the otherwise identical embodiment of FIG. 9, the second contact surface 32 is releasably attached by means of screws 4 to a mobile platform 50 which can move on wheels 51 without rails.

The pivot axis A of the robot joint module is arranged on a side, remote from the robotic arm (bottom in FIG. 7), of the first contact surface 11. It is a horizontal axis and is inclined by 90 degrees against a vertical joint axis of a joint of the robotic arm closest to the base, which is indicated by the joint angle q1, and intersects it. In addition, the pivot axis A overlaps the first contact surface 11, as can be easily seen in particular in FIG. 8.

A joint axis of the joint of the robotic arm following the joint closest to the base, which is indicated by the joint angle q2, is inclined relative to or parallel to the pivot axis A by 0° in the orientation shown in FIG. 7 of the base contact surface 11 relative to the first contact surface 31 in a zero position of the robotic arm shown in FIGS. 7, 8.

In the orientation of the base contact surface 11 relative to the first contact surface 31 shown in FIG. 8, this joint axis of the joint of the robotic arm following the joint closest to the base is, however, inclined by 90° or perpendicular to the pivot axis A in the zero position of the robotic arm shown in FIGS. 7, 8.

Figure 4:
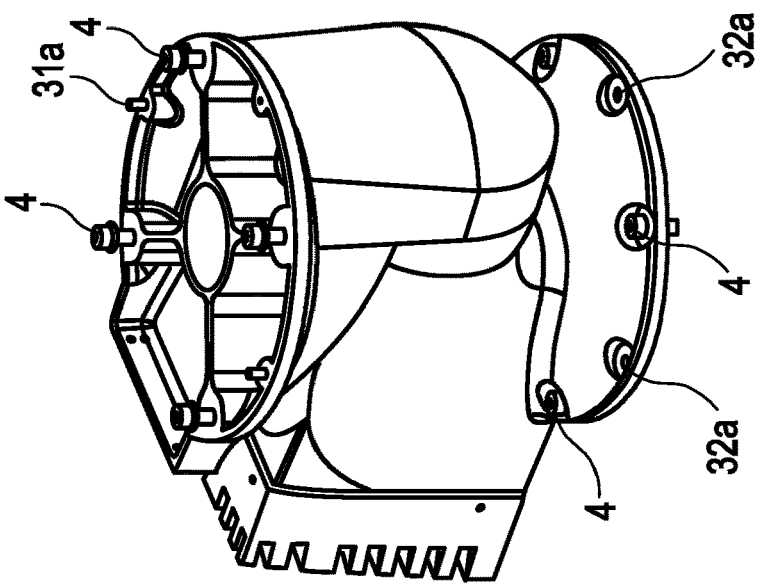
FIG. 4 shows the robot joint module of FIG. 2 by itself.
Figure 2:
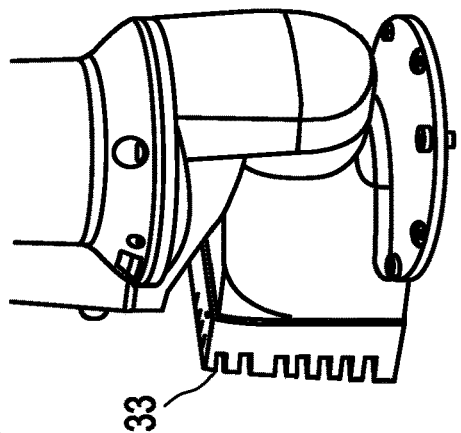
FIG. 2 depicts a detail enlargement of a robot joint module and a part of a proximal base of a robotic arm of the robot.
Figure 3:
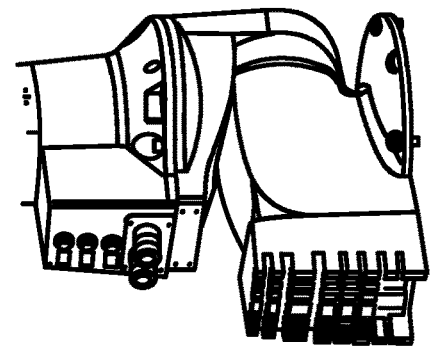
FIG. 3 shows the detail enlargement of FIG. 2 from another perspective.

In the pivot position shown in FIGS. 7, 8, the first and second contact surfaces 31, 32 are parallel to one another. The first contact surface 31 is arranged on an L-flange (cf. FIGS. 4, 10).

The hole pattern and a recess distribution with recesses 32a of the second contact surface 32 match the hole pattern or recess distribution of the base contact surface 11 with recesses for projections 31a of a projection distribution of the first contact surface, so that the second contact surface 32 can alternatively be placed on the same interface instead of the base contact surface 11, and screwed thereto by the screw distribution with the screws 4. As explained above, in one embodiment, (the) projections (31a) may be permanently or non-destructively releasably secured (locating) pins.

The first contact surface 31 of the robot joint module and the base contact surface 11 are designed such that they can alternatively be fastened to one another in four orientations offset relative to each other by 90°.

A height H between parallel first and second contact surfaces 31, 32 substantially corresponds to a maximum width D of the first contact surface 31.

A motor 62 of the robot joint module drive is arranged between the first and second contact surfaces 31, 32.

The first contact surface 31 overlaps the robot joint module drive, and in particular covers the motor 62 of the robot joint module drive.

The outer contour of the first contact surface 31 of the robot joint module and the outer contour of the base contact surface 11 substantially match. In a modification, a flexible cover 110 can cover a gap between the first contact surface and the base contact surface (dashed in FIG. 9).

Figure 10:
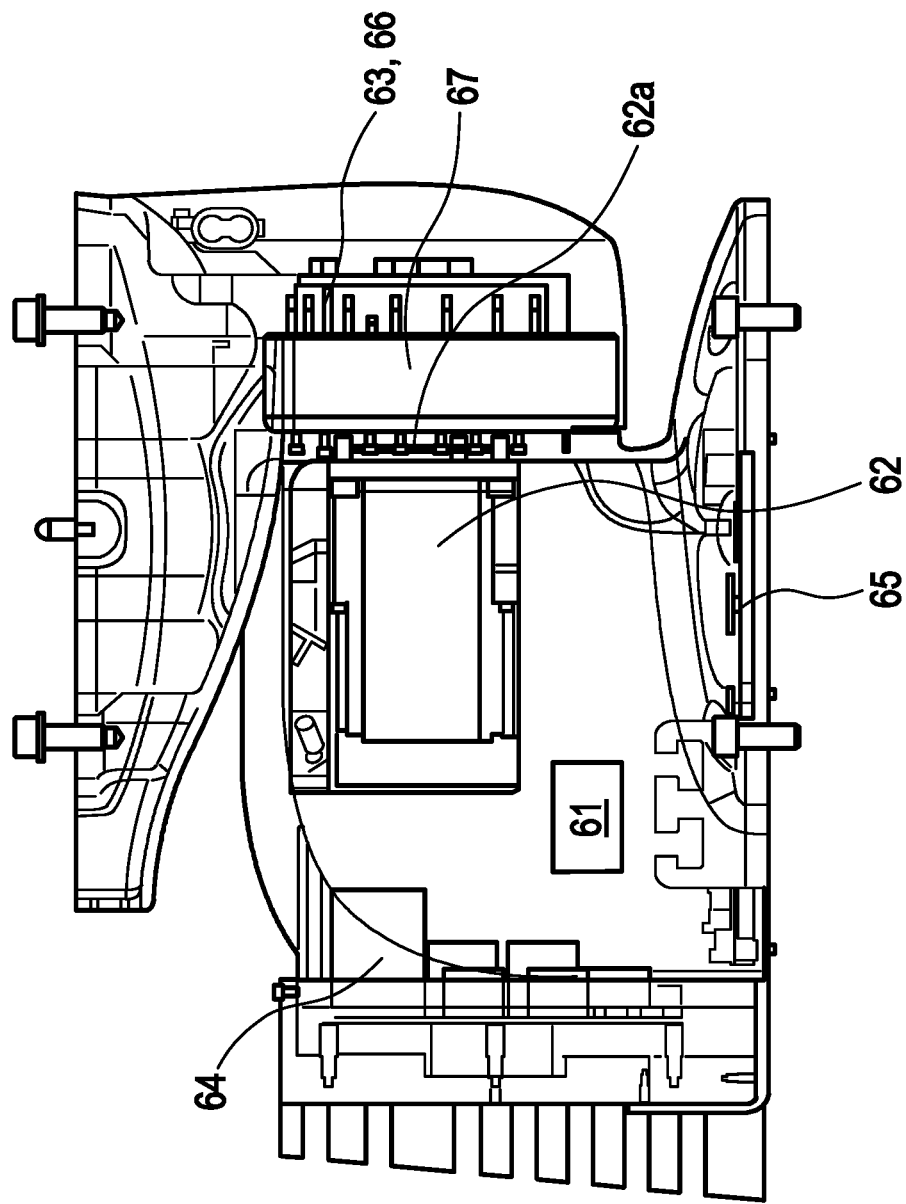
FIG. 10 shows a section through the exemplary robot joint module.

Inside the housing of the robot joint module, one or more sensors may be arranged for detecting (the presence of) the base contact surface on the first contact surface and/or a position and/or orientation of the base contact surface relative to the first contact surface, and/or for monitoring a safety region around the robot joint module, of which a sensor 61 is schematically indicated in FIG. 10.

The robot joint module has a brake integrated into the motor 62 with gearbox 62a for braking the pivot axis A, a joint torque sensor 63 on the output side, drive electrics 64 for operating the robot joint module drive, safety electronics 65 for monitoring the robot joint module, an adjustment sensor 66, and a cooling device in the form of cooling fins 33 for cooling one or more of these components.

The robot joint module also has a conductor guide in the form of a cable guide drum 67, which at least sectionally wraps around the pivot axis A, for guiding a conductor for communication with the joint torque sensor 63, and a conductor guide (68A, 68B.1, 68B.2), aligned with the pivot axis A, for guiding a conductor L fastened to the robotic arm sectionally parallel to the pivot axis A with a predetermined separation point between the magnetic adapter 68A, which is secured against rotation in a form-fitting manner, and the two-part cable holder 68B.1, 68B.2 of the conductor guide (68A, 68B.1, 68B.2).

FIGS. 7, 8 also show a robot controller 7 of a robot system according to one embodiment of the present invention for jointly controlling the robotic arm joint drives of the robotic arm and the robot joint module drive of the robot joint module—in particular, for simultaneously adjusting the pivot axis A and at least one of the joint axes of the robotic arm based upon a kinematics model having the pivot axis of the robot joint module and the joint axes of the joints of the robotic arm. In the embodiment of FIG. 9, this robot controller is arranged in the mobile platform.

To mount the robot, the base contact surface 11 is screwed to the first contact surface 31, and the second contact surface 32 is screwed to the stationary environment or mobile platform. If only the robotic arm is to be used by itself, the base contact surface 11 is detached from the first contact surface 31 and screwed to the stationary environment or mobile platform instead of the second contact surface 32.

In one embodiment, the maximum pivot range about the pivot axis A is limited by one or more stops (not shown) and/or by software—in particular, by or in the robot controller 7—to ±90 degrees or less than ±90 degrees, or to 180 degrees or less than 180 degrees, e.g., to ±85 degrees or 170 degrees or the like.

Figure 11:
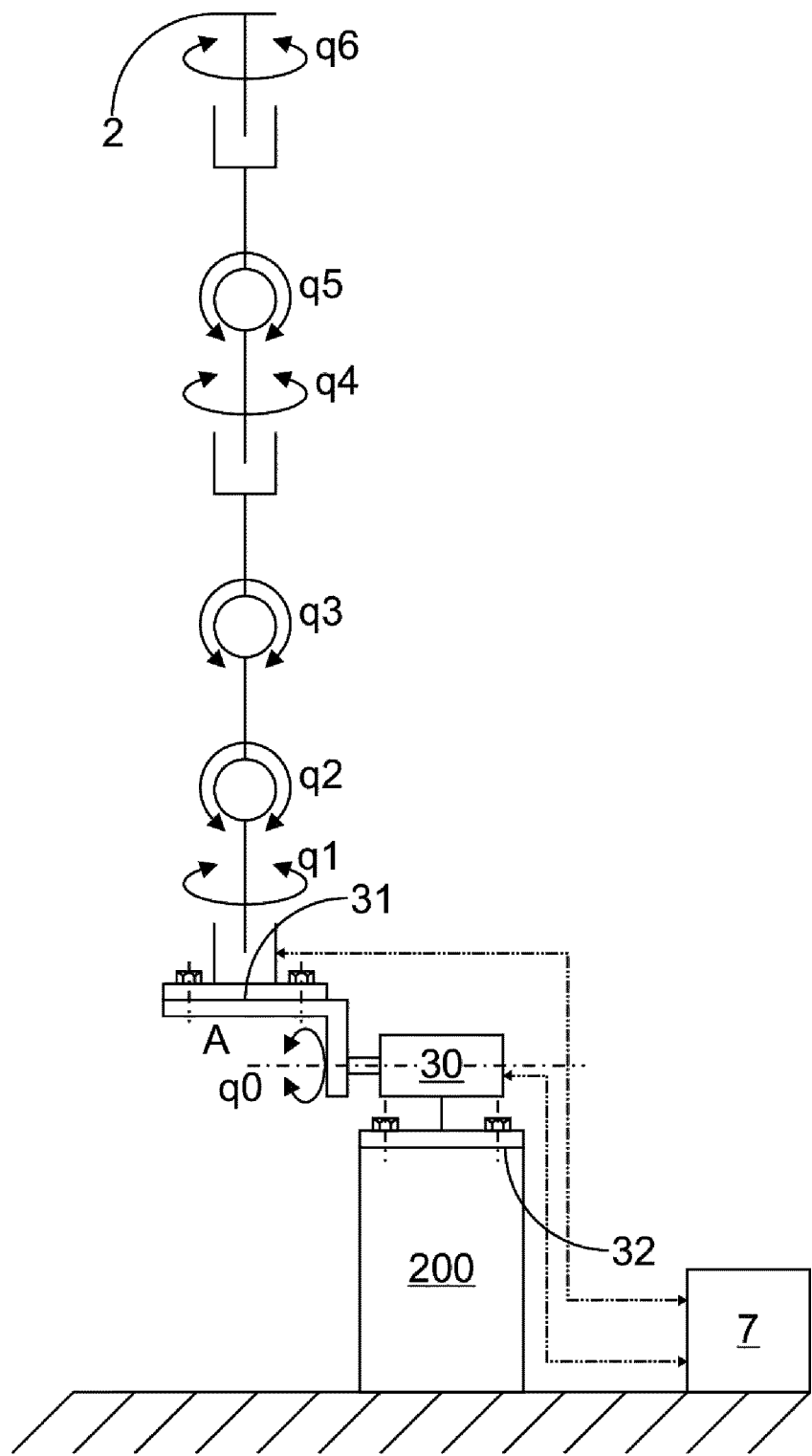
FIG. 11 schematically depicts a part of a robot according to a further embodiment of the present invention in an illustration corresponding to FIG. 8.

FIG. 11 shows a part of a robot according to a further embodiment of the present invention in an illustration corresponding to FIG. 8. Elements corresponding to one another are identified by identical reference signs so that reference is made to the above description, and only differences will be discussed below.

In the embodiment of FIG. 11, the first and second contact surfaces of the robot joint module with an attached robotic arm (when the robotic arm is in a corresponding position) can be swung by more than ±120 degrees relative to each other, and, without an attached robotic arm, even by more than ±360 degrees. The first and second contact surfaces are also arranged on opposite sides of a normal plane to the pivot axis. As an alternative to the platform 200 of the stationary environment, the second contact surface 32 could also be fastened to the mobile platform 50 (cf. FIG. 9).

Figure 5:
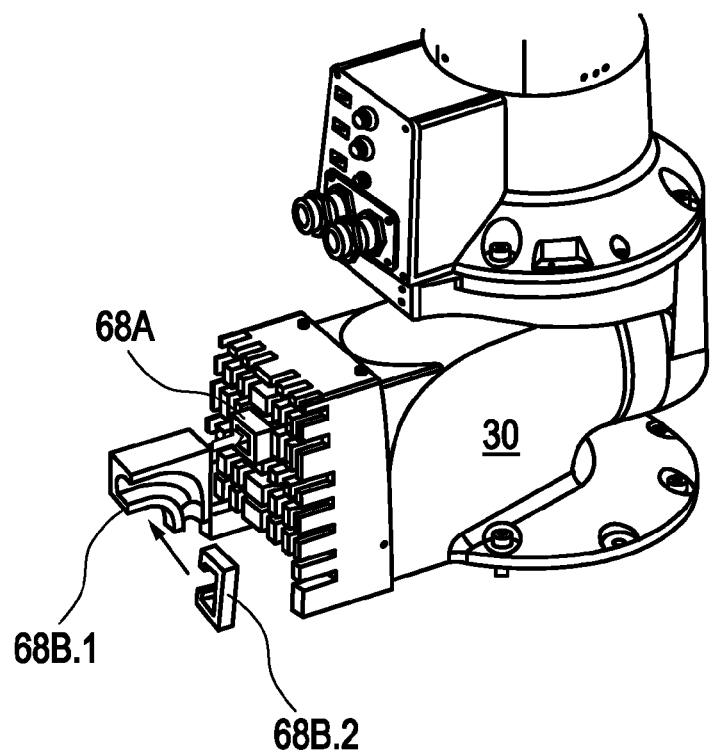
FIG. 5 shows the robot joint module in an illustration corresponding to FIG. 3, with a conductor guide for a conductor fastened to the robotic arm.
Figure 6:
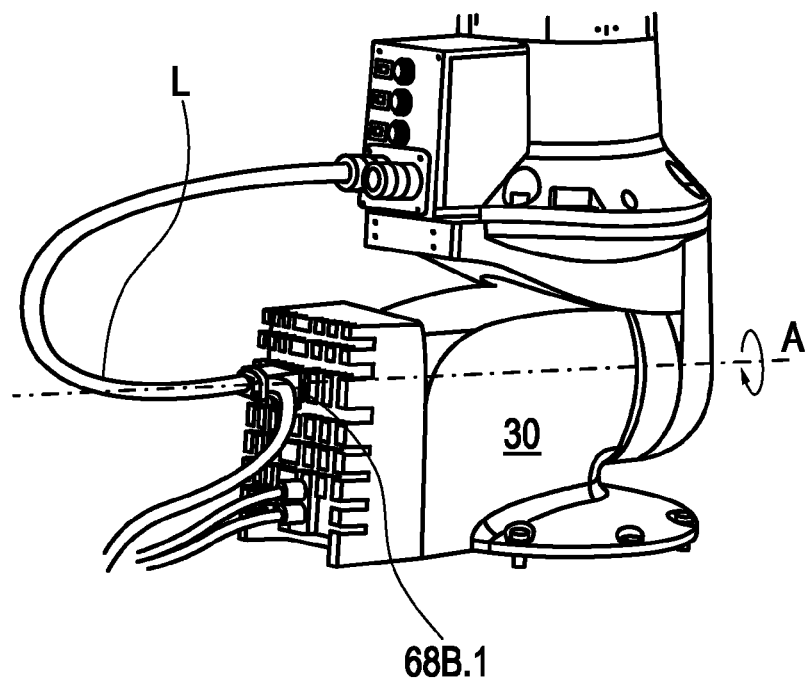
FIG. 6 shows the robot joint module of FIG. 5, the conductor guide, and a conductor guided therethrough and fastened to the robotic arm.

FIG. 12A shows a part of a robot according to another embodiment of the present invention in an illustration corresponding to FIG. 5, wherein the perspective is different, and FIG. 12B shows the part of this robot with indicated conductors. Elements corresponding to one another are identified by identical reference signs so that reference is made to the above description, and only differences will be discussed below.

In the embodiment of FIGS. 12A, 12B, several conductors 210 of the robotic arm, e.g., electrical supply and communication or signal lines for robotic arm joint drives and/or robotic arm sensors and/or water, oil, and/or (compressed) air lines, are, within a cover 220, (introduced) guided into the robot joint module 30.

The cover 220 is attached to the base 10.

The conductors 210 are guided into or through a cable guide drum 67' which is integrally formed with the cover 220.

In FIG. 12B, a conductor 210' for supplying and/or communicating with a robot joint module side or robot joint module sensor 230 is guided into or through the cable guide drum 67'.

A connection point of this conductor 210' is arranged, together with connection points of the conductors 210 of the robotic arm, in a common external connection 241 of the robot joint module 30 or heat sink 240.

250 indicates an electrical supply and communication or signal line for the robot joint module drive, the connection point of which is arranged in a further external connection 242 of the robot joint module 30 or the heat sink 240.

Figure 13A:
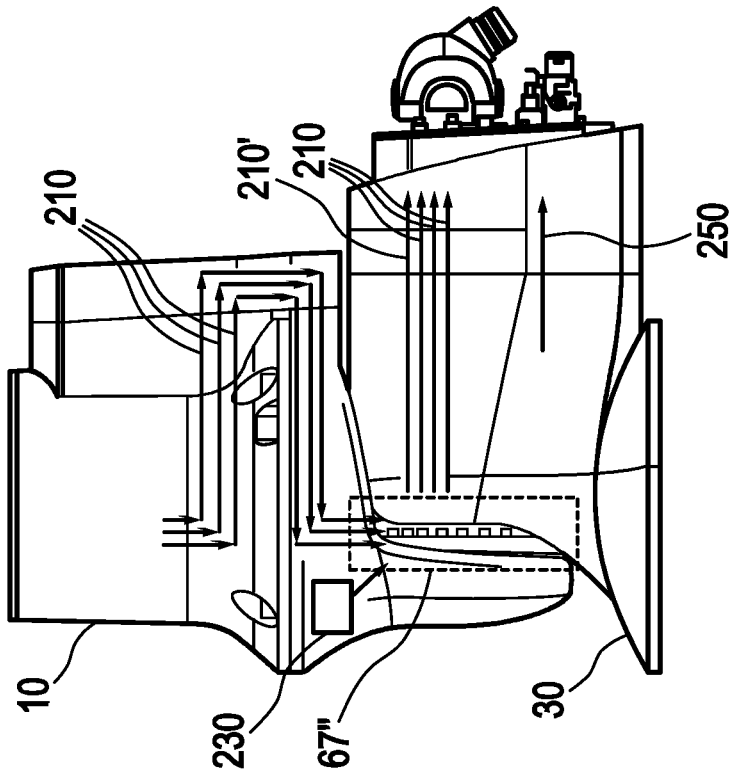
FIGS. 13A, 13B show a part of a robot according to a further embodiment of the present invention in an illustration corresponding to FIGS. 12A, 12B.
Figure 13B:
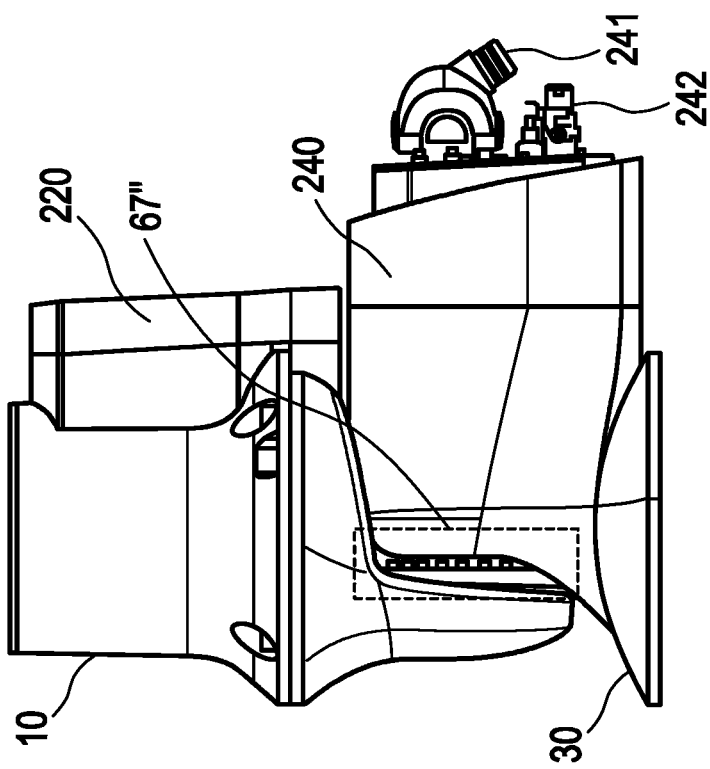

FIGS. 13A, 13B show a part of a robot according to a further embodiment of the present invention in an illustration corresponding to FIGS. 12A, 12B. Elements corresponding to one another are identified by identical reference signs so that reference is made to the above description, and only differences will be discussed below.

In the embodiment of FIGS. 13A, 13B, the cable guide drum 67" is not integrally formed with the cover 220, but is arranged inside the robot joint module 30.

As in the embodiment of FIGS. 12A, 12B, the robot joint module 30 also has, in the embodiment of FIGS. 13A, 13B, a heat sink 240 with power electronics (not shown) and external connections 241, 242.

FIGS. 14A, 14B show a part of a robot according to another embodiment of the present invention in an illustration corresponding to FIGS. 12A, 12B and FIGS. 13A, 13B, respectively. Elements corresponding to one another are identified by identical reference signs so that reference is made to the above description, and only differences will be discussed below.

In the embodiment of FIGS. 14A, 14B, the conductors 210 have plug-in connections which are indicated in FIG. 14B by a plug connector 260A on the robotic arm side, and a mating connector 260B on the robot joint module side.

Although embodiments have been explained in the preceding description, it is noted that a large number of modifications are possible. It is also noted that the embodiments are merely examples that are not intended to restrict the scope of protection, the applications, and the structure in any way. Rather, the preceding description provides a person skilled in the art with guidelines for implementing at least one exemplary embodiment, wherein various changes—in particular, with regard to the function and arrangement of the described components—are able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

2 End-effector
4 Screw
7 Robot controller
10 Base
11 Base contact surface
30 Robot joint module
31 First contact surface
31a Projection
32 Second contact surface
32a Recess
33 Cooling fin
50 Mobile platform
51 Wheels
61 Sensor
62 Motor
62a Gearbox
63 Joint torque sensor
64 Drive electrics
65 Safety electronics 66 Adjustment sensor
67; 67'; 67" Cable guide drum
68A Magnetic adapter
68B.1, 68B.2 Cable holder
110 Cover
200 Platform
210; 210' Conductor
220 Cover
230 Sensor
240 Heat sink
241, 242 External connection
250 Conductor
260A, 260B Plug-in connection
A Pivot axis
D Maximum width
H Height
L Conductor
q0 Pivot angle
q1 Joint angle of the joint closest to the base

What is claimed is:

1. A robot, comprising:
a robotic arm comprising:
    a base with a base contact surface adapted and configured to mount the robotic arm to a stationary environment or mobile platform, and
    an end-effector connected to the base by joints which can be adjusted by robotic arm joint drives such that the end-effector has at least five actuated degrees of freedom with respect to the base; and
a robot joint module comprising:
    a first contact surface fastenable to the base contact surface,
    a second contact surface configured for fastening the robot to the stationary environment or mobile platform,
    wherein a hole pattern of the second contact surface corresponds to a hole pattern of the base contact surface for mounting the base to the stationary environment or mobile platform, and
    at least one robot joint module drive configured for pivoting the first contact surface relative to the second contact surface about a pivot axis, whereby the end-effector has at least six actuated degrees of freedom with respect to the second contact surface.

2. The robot of claim 1, wherein at least one of:
the end-effector has at least six actuated degrees of freedom with respect to the base;
the first contact surface is releasably fastenable to the base contact surface;
the end-effector has at least six actuated degrees of freedom with respect to the stationary environment or mobile platform;
the end-effector has at least seven actuated degrees of freedom with respect to the second contact surface; or
the end-effector has at least seven actuated degrees of freedom with respect to the stationary environment or mobile platform.

3. The robot of claim 1, wherein at least one of:
the pivot axis of the robot joint module is arranged on a side of the first contact surface that faces away from the robotic arm;
the pivot axis of the robot joint module is inclined by at least 60 degrees, and at most 120 degrees, with respect to a joint axis of a joint of the robotic arm that is closest to the base;
the pivot axis of the robot joint module intersects the joint axis of the joint of the robotic arm that is closest to the base;
the pivot axis of the robot joint module overlaps at least one of the first contact surface or second contact surface;
the pivot axis of the robot joint module is parallel to at least one of the first contact surface or second contact surface;
a joint axis of a joint of the robotic arm that follows the joint closest to the base is inclined by:
    at most ±30 degrees with respect to the pivot axis of the robot joint module in at least one position of the robotic arm, or
    at least 60 degrees and at most 120 degrees with respect to the pivot axis of the robot joint module in at least one position of the robotic arm;
the first and second contact surfaces can be pivoted with respect to one another:
    by ±120 degrees,
    by more than ±120 degrees,
    by a maximum of ±90 degrees, or
    by a maximum of less than ±90 degrees;
the first and second contact surfaces are tilted parallel to each other in a swivel position;
the first and second contact surfaces are tilted against each other in at least one swivel position; or
at least one of the first or second contact surface is arranged on an L-flange.

4. The robot of claim 3, wherein:
the joint axis of the joint of the robotic arm that follows the joint closest to the base is parallel to the pivot axis of the robot joint module in at least one position of the robotic arm; or
the joint axis of the joint of the robotic arm that follows the joint closest to the base is perpendicular to the pivot axis of the robot joint module in at least one position of the robotic arm.

5. The robot of claim 1, wherein the second contact surface of the robot joint module is designed in such a way that at least one of:
the second contact surface can be fastened directly to an interface that is configured to be coupled with the base contact surface of the robotic arm;
a distribution of projections on the second contact surface can be inserted into a distribution of recesses on the interface which correspond to a distribution of projections of the base contact surface; or
a distribution of recesses on the second contact surface can be coupled with a distribution of projections on the interface which correspond to a distribution of recesses of the base contact surface.

6. The robot of claim 1, characterized in that the first contact surface of the robot joint module and the base contact surface are designed such that they can alternatively be fastened to one another in at least two orientations offset relative to one another.

7. The robot of claim 1, wherein at least one of:
a height between parallel first and second contact surfaces is at most 1.5 times a maximum width of the first or second contact surface;
at least one motor of the robot joint module drive is arranged between the first and second contact surfaces;
the first contact surface overlaps the robot joint module drive; or
the first contact surface covers the at least one motor of the robot joint module drive.

8. The robot of claim 1, wherein at least one of:
an outer contour of the first contact surface of the robot joint module and an outer contour of the base contact surface deviate from each other by at most 10 percent; or
a flexible cover is arranged on at least one of the robot joint module or on the robotic arm for at least partially covering a gap between the first contact surface and the base contact surface.

9. The robot of claim 1, further comprising:
a detection device on at least one of the robotic arm side or the robot joint module side;
the detection device configured for detecting at least one of:
the base contact surface on the first contact surface, or
at least one of a position or an orientation of the base contact surface relative to the first contact surface.

10. The robot of claim 1, further comprising:
a detection device on the robot joint module side, the detection device configured for monitoring a safety region around the robot joint module.

11. The robot of claim 1, wherein the robot joint module comprises at least one of:
a brake configured for at least one of braking or fixing a position of the pivot axis;
a detection device configured for detecting at least one of at least one joint force or at least one joint torque;
drive electronics configured for operating the robot joint module drive;
safety electronics configured for monitoring the robot joint module;
an adjustment sensor configured for detecting an adjustment position of the pivot axis; or
a cooling device configured for cooling one or more components of the robot joint module.

12. The robot of claim 1, wherein at least one of an accuracy, sensitivity, or safety of the robot joint module drive corresponds to at least a respective accuracy, sensitivity, or safety of at least one of the robotic arm joint drives.

13. The robot of claim 1, wherein at least one of:
the robot joint module has at least one conductor guide, the at least one conductor guide configured for at least one of:
rotation about, or being rotationally fixed about, the pivot axis,
alignment with the pivot axis,
wrapping around the pivot axis, at least sectionally,
guiding at least one conductor for supplying the robot joint module or communicating with the robot joint module, or
guiding at least one conductor fastened to the robotic arm;
at least one conductor of the robotic arm is guided into the robot joint module;
at least one conductor of the robotic arm has at least one plug-in connection between the robotic arm and the robot joint module; or
at least one conductor of the robotic arm has at least one sliding contact between the robotic arm and the robot joint module.

14. The robot of claim 13, wherein at least one of:
the at least one conductor guide has at least one predetermined separation point;
the at least one conductor guide guides the at least one conductor fastened to the robotic arm at least sectionally parallel to the pivot axis; or
the at least one conductor of the robotic arm is guided into the robot joint module within a cover.

15. A robot system, comprising:
a robot according to claim 1; and
a robot controller configured for jointly controlling the robotic arm joint drives of the robotic arm and the robot joint module drive of the robot joint module.

16. The robot system of claim 15, wherein the robot controller is configured for at least one of:
controlling the robotic arm joint drives and the robot joint module drive based on a kinematics model that includes the pivot axis of the robot joint module and the joint axes of the joints of the robotic arm; or
controlling the robotic arm joint drives and the robot joint module drive by simultaneously adjusting the pivot axis of the robot joint module and at least one joint axis of a joint of the robotic arm.

17. A robot joint module for a robotic arm, the robotic arm having a base with a base contact surface adapted and configured to mount the robotic arm to a stationary environment or mobile platform, and an end-effector connected to the base by joints which can be adjusted by robotic arm joint drives such that the end-effector has at least five actuated degrees of freedom with respect to the base, the robot joint module comprising:
a first contact surface configured for fastening to the base contact surface of a robot;
a second contact surface configured for fastening the robot to the stationary environment or mobile platform;
wherein a hole pattern of the second contact surface corresponds to a hole pattern of the base contact surface for mounting the base to the stationary environment or mobile platform; and
at least one robot joint module drive configured for pivoting the first contact surface relative to the second contact surface about a pivot axis, whereby the end-effector has at least six actuated degrees of freedom with respect to the second contact surface.

18. A method for mounting a robot to a stationary environment or mobile platform, the method comprising:
obtaining a robot according to claim 1; and
at least one of:
fastening the first contact surface to the base contact surface,
fastening the second contact surface to the stationary environment or mobile platform,
detaching the base contact surface from the first contact surface of the robot joint module, or
fastening the base contact surface to the stationary environment or mobile platform in place of the second contact surface.

19. The method of claim 18, further comprising at least one of:
at least partially automatically detecting, or manually entering, information associated with at least one of:
a presence of the base contact surface on the first contact surface, or
at least one of a position or orientation of the base contact surface relative to the first contact surface; or
calibrating the robot.

20. The method of claim 18, further comprising:
controlling the robotic arm joint drives and the robot joint module drive with a robot controller.

21. The method of claim 20, wherein at least one of:
controlling the robotic arm joint drives and the robot joint module drive comprises controlling based on a kinematics model that includes the pivot axis of the robot joint module and the joint axes of the joints of the robotic arm; or controlling the robotic arm joint drives and the robot joint module drive comprises simultaneously adjusting the pivot axis of the robot joint module and at least one joint axis of a joint of the robotic arm.

* * * * *